(12) United States Patent
Ohta et al.

(10) Patent No.: US 7,857,471 B2
(45) Date of Patent: Dec. 28, 2010

(54) OPTICAL SHEET HAVING BONDED PRISM AND POLARIZER SHEETS AND DISPLAY DEVICE

(75) Inventors: Eiji Ohta, Miyagi (JP); Shigehiro Yamakita, Miyagi (JP); Makoto Aoki, Miyagi (JP); Toru Abiko, Miyagi (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 11/949,247

(22) Filed: Dec. 3, 2007

(65) Prior Publication Data

US 2008/0137346 A1 Jun. 12, 2008

(30) Foreign Application Priority Data

Dec. 6, 2006 (JP) ............... 2006-330043

(51) Int. Cl.
*F21V 9/14* (2006.01)
*F21V 5/02* (2006.01)
(52) U.S. Cl. .............. 362/19; 362/339; 362/355; 362/311.06; 362/246; 362/217.04
(58) Field of Classification Search ............... 362/19, 362/217.04, 246, 311.06, 339, 355; 349/64
See application file for complete search history.

(56) References Cited

U.S. PATENT DOCUMENTS

| 2,180,114 | A | * | 11/1939 | Land ............... 362/19 |
| 2,887,566 | A | * | 5/1959 | Marks ............ 362/19 |
| 5,422,756 | A | * | 6/1995 | Weber ............ 359/487 |
| 5,833,344 | A | * | 11/1998 | Arai et al. ........ 362/620 |
| 6,104,854 | A | * | 8/2000 | Masaki et al. ..... 385/133 |
| 6,570,710 | B1 | * | 5/2003 | Nilsen et al. ..... 359/625 |
| 6,846,089 | B2 | * | 1/2005 | Stevenson et al. ... 362/627 |
| 7,244,476 | B2 | * | 7/2007 | Sumida et al. ..... 428/1.5 |
| 7,436,469 | B2 | | 10/2008 | Gehlsen et al. |
| 2002/0080598 | A1 | * | 6/2002 | Parker et al. ...... 362/31 |
| 2007/0134438 | A1 | * | 6/2007 | Fabick et al. ..... 428/1.1 |
| 2008/0232113 | A1 | * | 9/2008 | Horii et al. ....... 362/333 |
| 2008/0239200 | A1 | * | 10/2008 | Hirai et al. ....... 349/62 |
| 2008/0259243 | A1 | * | 10/2008 | Ohta et al. ....... 349/64 |

FOREIGN PATENT DOCUMENTS

| JP | 2003-075613 | 3/2003 |
| JP | 2003-279988 | 10/2003 |
| JP | 3704364 | 7/2005 |
| JP | 2006-147566 | 6/2006 |
| JP | 2006-236804 | 9/2006 |
| JP | 2008-517326 | 5/2008 |
| WO | 2006/044292 | 4/2006 |
| WO | 2006/080530 | 8/2006 |

OTHER PUBLICATIONS

Japanese Office Action issued on Feb. 3, 2009, for corresponding Japanese Patent Application JP 2006-330043.

* cited by examiner

*Primary Examiner*—Ismael Negron
(74) *Attorney, Agent, or Firm*—K&L Gates LLP

(57) ABSTRACT

The optical sheet includes a first lens sheet having a plurality of first three-dimensional structures arrayed to extend to one surface thereof, and a reflective polarizer sheet for transmitting either one of p-polarization component and s-polarization component of incident light and reflecting the other of p-polarization component and s-polarization component of the incident light. Head portions of the first three-dimensional structures are bonded to the reflective polarizer sheet.

10 Claims, 8 Drawing Sheets

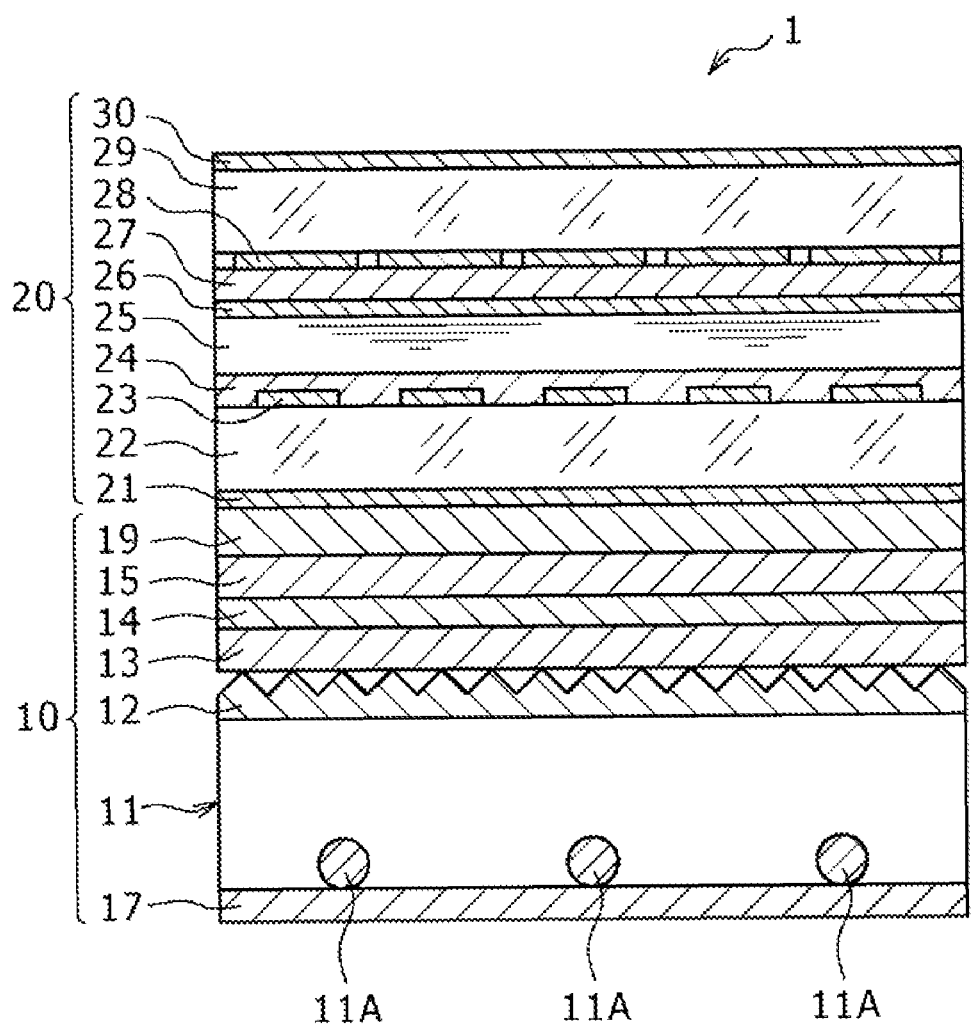

OPTICAL SHEET HAVING BONDED PRISM AND POLARIZER SHEETS AND DISPLAY DEVICE

CROSS REFERENCE TO RELATED APPLICATIONS

The present application claims priority of Japanese patent Application No. 2006-330043 filed in the Japanese Patent Office on Dec. 6, 2006, the entire contents of which are incorporated herein by reference.

BACKGROUND

The present application relates to a light-transmissive optical sheet and a display device having such optical sheet incorporated therein.

Recently, liquid crystal display devices have been replacing cathode ray tubes (CRTs), the conventional main stream of display devices, by virtue of their advantages of low power consumption and space-saving property, possibility of cost-down and so forth. There are several types of liquid crystal display devices when classified typically by modes of illumination for image display, wherein representative ones include transmissive display device providing image display making use of a surface emission light source disposed behind a liquid crystal panel.

In such a transmissive display device, it is desirable to enhance the display luminance and to widen the angle of view, in view of raising the merchandise value. For this reason, a lens sheet and a reflective polarizer sheet having a diffuser function have been disposed between the surface emission light source and the liquid crystal panel, in this order as viewed from the surface emission light source (see Japanese Patent No. 3704364, Patent Document 1). By this configuration, diffusive light emitted from the surface emission light source is condensed by the lens sheet, and thereby the front luminance increases. The light thus condensed is separated by the reflective polarizer sheet into p- and s-waves, wherein only the p-wave is allowed to transmit therethrough. The s-wave herein is reflected by the reflective polarizer sheet, wherein the reflected s-wave is reflected again on a reflective sheet in the surface emission light source to be separated again into the p-wave and s-wave, and re-used. The light incident on the reflective polarizer sheet is diffused by the diffuser function of the reflective polarizer sheet, and widened in the angle of divergence. As a consequence, the display device is raised in the display luminance, and widened in the angle of view.

As described in the above, the lens sheet is used for enhancing the display luminance of the display device, but may be deflected due to heat of the surface emission light source towards the liquid crystal panel side, and such deflection may induce non-uniform luminance or may injure the liquid crystal panel. This problem becomes more distinctive as the screen size increases. Thickening of the lens sheet or composition thereof using a hard material may be possible measures for preventing the deflection. The thickening of the lens sheet will, however, thicken the display device to as much as such thickness. This is against the recent trend of thinning, and may degrade the merchandize value.

SUMMARY

The present application addresses the above-described problems associated with developing technologies. One advantage of the present application is to provide an optical sheet, hardly causing deflection in the lens sheet without thickening the sheet nor composing it using a hard material, and also to provide a display device having such optical sheet incorporated therein.

In accordance with one embodiment, there is provided an optical sheet including a first lens sheet having a plurality of first three-dimensional structures arrayed to extend to one surface thereof, and a reflective polarizer sheet for transmitting either one of p-polarization component and s-polarization component of incident light and reflecting the other of p-polarization component and s-polarization component of the incident light. The head portions of the first three-dimensional structures are bonded to the reflective polarizer sheet.

Because the head portions of the first three-dimensional structures are bonded to the reflective polarizer sheet in the optical sheet of the present application, deformation behavior of the first lens sheet is limited by virtue of integration with the reflective polarizer sheet.

A display device according to an embodiment has a panel driven based on image signals, and a light source emitting light for illuminating the panel. An optical sheet is provided between the panel and the light source. The optical sheet has a lens sheet having a plurality of three-dimensional structures arrayed to extend to one surface thereof, and a reflective polarizer sheet for transmitting either one of p-polarization component and s-polarization component of incident light and reflecting the other of p-polarization component and s-polarization component of the incident light, and head portions of the three-dimensional structures are bonded to the reflective polarizer sheet.

Because the head portions of the three-dimensional structures are bonded to the reflective polarizer sheet in the display device of one embodiment, deformation behavior of the lens sheet may be limited by virtue of integration with the reflective polarizer sheet.

Because the head portions of the first three-dimensional structures are bonded to the reflective polarizer sheet in the optical sheet of one embodiment, deformation behavior of the first lens sheet may be limited by virtue of integration with the reflective polarizer sheet. Accordingly, the first lens sheet may almost completely be prevented from causing deflection, without thickening the first lens sheet, nor composing it using a hard material.

Because the head portions of the three-dimensional structures are bonded to the reflective polarizer sheet in the display device of one embodiment, deformation behavior of the lens sheet may be limited by virtue of integration with the reflective polarizer sheet. Accordingly, the lens sheet may almost completely be prevented from causing deflection, without thickening the lens sheet, nor composing it using a hard material.

When the width of bonding of each of the first three-dimensional structures in the direction of array thereof is 20% or smaller of the width of each of the first three-dimensional structures in the direction of array thereof, the lens sheet may almost completely be prevented from causing deflection, while minimizing lowering in the luminance due to bonding between the head portions of the three-dimensional structures and the reflective polarizer sheet.

Additional features and advantages are described herein, and will be apparent from, the following Detailed Description and the figures.

BRIEF DESCRIPTION OF THE FIGURES

FIG. 11 is a sectional view showing another exemplary configuration of the display device shown in FIG. 1.

DETAILED DESCRIPTION

Embodiments will be described below with reference to the attached drawings.

Figure 1:
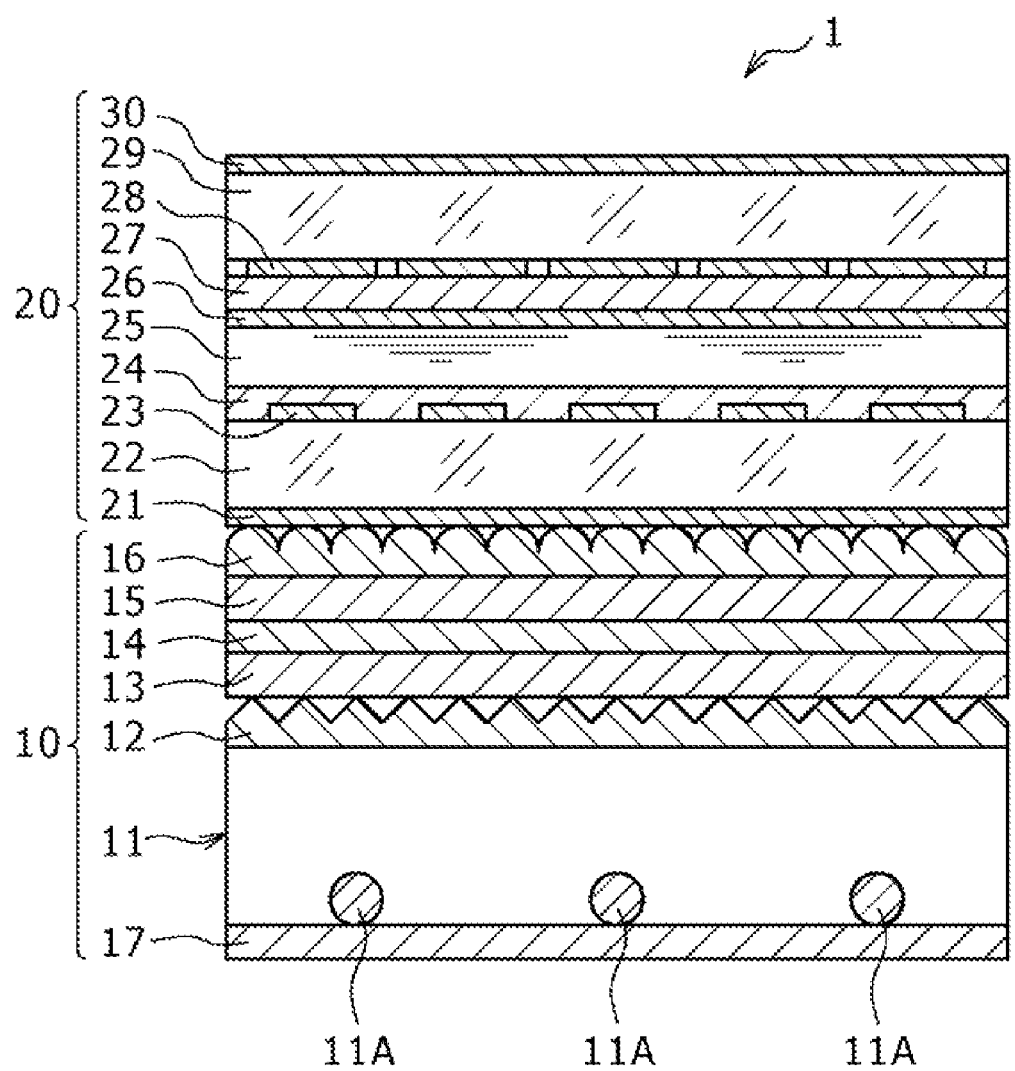
FIG. 1 is a sectional view showing an exemplary configuration of a display device according to one embodiment.

FIG. 1 shows a sectional structure of a display device 1 according to one embodiment. The display device 1 has a transmissive liquid crystal panel 20 on which the individual pixels are driven according to video signals, a lighting unit 10 disposed behind the liquid crystal panel 20, and a drive circuit (not shown) for driving the liquid crystal panel 20 for image display, wherein the surface of the liquid crystal panel 20 is directed to the observer (not shown). It is to be understood that, in this embodiment, the liquid crystal panel 20 is disposed so that the surface thereof is aligned normal to the horizontal plane for the convenience's sake.

The liquid crystal panel 20 has a stacked structure having a liquid crystal layer 25 held between a transparent substrate 29 on the observer side and a transparent substrate 22 on the lighting unit 10 side. More specifically, when viewed from the lighting unit 10 side, the panel has a polarizer plate 21, a transparent substrate 22, transparent electrodes 23, an alignment film 24, a liquid crystal layer 25, an alignment film 26, a transparent electrode 27, a color filter 28, a transparent substrate 29 and a polarizer plate 30 in this order.

The polarizer plates 21, 30 are kind of optical shutters, and allow only light (polarized light) having a predetermined direction of oscillation to pass therethrough. The polarizer plates 21, 30 are disposed so that the polarization axes thereof cross normal to each other, so as to allow light emitted from the lighting unit 10 to pass therethrough via the liquid crystal layer 25, or to intercept it.

Each of the transparent substrates 22, 29 is composed of a substrate transparent to the visible light, which is sheet glass for example. Although not shown, the transparent substrate 22 on the lighting unit 10 side has, formed thereon, an active type drive circuit containing TFTs (thin film transistors) as driving elements electrically connected to the transparent pixel electrodes 23, and interconnects.

The transparent electrodes 23, 27 are composed of ITO (indium tin oxide), for example. The transparent electrodes 23 are provided on the transparent substrate 22 with a lattice arrangement or a delta arrangement, and function as the electrodes for the individual dots (pixels). On the other hand, the transparent electrode 27 is formed over the entire surface of the color filter 28, and functions as a common electrode for the individual transparent electrodes 23.

Each of the alignment films 24, 26 are composed of a polymer material such as polyimide, and functions as aligning liquid crystal.

The liquid crystal layer 25 is composed of a liquid crystal of, for example, VA (vertical alignment) mode, TN (twisted nematic) mode or STN (super twisted nematic) mode, and expresses a modulation function such as allowing light emitted from the lighting unit 10 to pass therethrough, or intercepting the light on the pixel basis, according to voltage applied by the drive circuit. Gradation may be adjustable by pixels by varying transmittance level of light through the liquid crystal.

The color filter 28 has color filter elements for separating the light transmitted through the liquid crystal layer 25 into, for example, three primary colors of red (R), green (G) and blue (B), or into four color of R, G, B and white (W), arranged as being corresponded to the array of the transparent electrodes 23.

The lighting unit 10 has a light source 11, and has, on the liquid crystal panel 20 side of the light source 11, a light source image dividing sheet 12, a diffuser sheet 13, a lens sheet 14 (first lens sheet), a reflective polarizer sheet 15 and a lens sheet 16 (second lens sheet) arranged in this order as viewed from the light source 11 side, and has also a reflective sheet 17 disposed behind the light source 11. As is clear from the configuration, the lighting unit 10 is configured as of so-called, straight-under type. It is to be understood that the stacked structure composed of the lens sheet 14, the reflective polarizer sheet 15 and the lens sheet 16 in this embodiment corresponds to one specific example of the "optical film" of one embodiment.

The light source 11 has a plurality of linear light sources 11A arranged in parallel at regular intervals (at 20-mm intervals, for example). The linear light sources 11A are typically cold cathode fluorescent lamps (CCFLs), but may be spot light sources, such as light emitting diodes (LEDs) or organic electro-luminescence (EL) elements linearly arranged. The individual linear light sources 11A are arranged, for example, as being extended in the horizontal direction (the direction normal to the sheet of FIG. 1).

The reflective sheet 17 is configured by stacking, for example, aluminum (Al), PET (polyethylene terephthalate) foam and polycarbonate in this order as viewed from the light source 11 side, so as to reflect a part of light emitted from the light source 11 back to the direction of the liquid crystal panel 20. Therefore the light emitted from the light source 11 may effectively be used.

Figure 2:
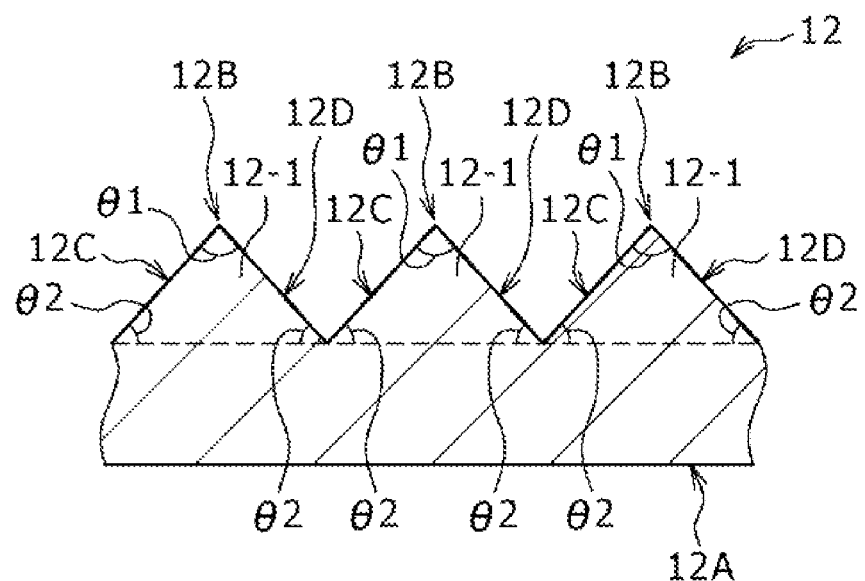
FIG. 2 is a sectional view showing an exemplary configuration of a light source image dividing sheet shown in FIG. 1.

The light source image dividing sheet 12 is composed, for example, of a transparent resin material. The light source image dividing sheet 12 is disposed so as to align the bottom plane 12A thereof in parallel with the surface of the liquid crystal panel 20. The light source image dividing sheet 12 has a plurality of prismatic lenses 12-1 (three-dimensional structures) consecutively arranged on the surface thereof on the liquid crystal panel 20 side, as being extended along a plane in parallel with the bottom plane 12A of the light source image dividing sheet 12, as shown in FIG. 2 as one example of an enlarged sectional view. The individual lenses 12-1 herein are preferably arranged so that the direction of extension of the individual lenses 12-1 are aligned in parallel with the direction of extension of the light sources 11A (horizontal direction, for example), but may be arranged away from the direction of extension of the linear light sources 11A, only within a range allowable in terms of optical characteristics. Each of the lenses 12-1 has a triangular prismatic geometry having slopes 12C, 12D, for example, brought into contact with a head portion 12B with an apex angle $\theta 1$, wherein the slopes 12C, 12D are obliquely opposed at a base angle of $\theta 2$ arisen up above the bottom plane 12A.

By virtue of this configuration, the light source image dividing sheet 12 can emit components of light incident on the bottom plane 12A or on the slopes 12C, 12D at angles smaller than the critical angle, out of all components of light emitted from a single linear light source 11A, whereas the sheet can cause total reflection of components of light incident at angles equal to or larger than the critical angle, so that the sheet may be said as having a function of dividing a light source image produced by a single linear light source 11A into a plurality of images depending on the number of slopes (strictly speaking, the number of planes classified by angles of inclination). In other words, the light source image dividing sheet 12 divides a light source image produced by a single linear light source 11A into plurality of images, and can thereby make spaces between the divided every adjacent light source images narrower than the spaces between every adjacent linear light sources 11A, so that difference between the luminance level (maximum value) of divided light source images and the luminance level (minimum value) of spaces between every adjacent divided light source images may be reduced, as compared with difference between the luminance level (maximum value) of undivided light source images and the luminance level (minimum level) of spaces between every adjacent undivided light source images, to thereby reduce non-uniformity in the illuminance. As a consequence, the light source image dividing sheet 12 may also be understood as a kind of diffuser sheet.

The diffuser sheet 13 is composed, for example, of a diffuser plate formed by dispersing a diffuser material (filler) in a plate-like transparent resin having a relatively large thickness, a diffuser film formed by coating a transparent resin (binder) containing a diffuser material onto a film-like transparent resin having a relatively small thickness, or a combined material of them. PET, acryl, polycarbonate and the like may be used for the plate-like or film-like transparent resin. Inorganic fillers such as $SiO_2$, and organic fillers such as acryl may be used for the diffuser material.

Figure 3:
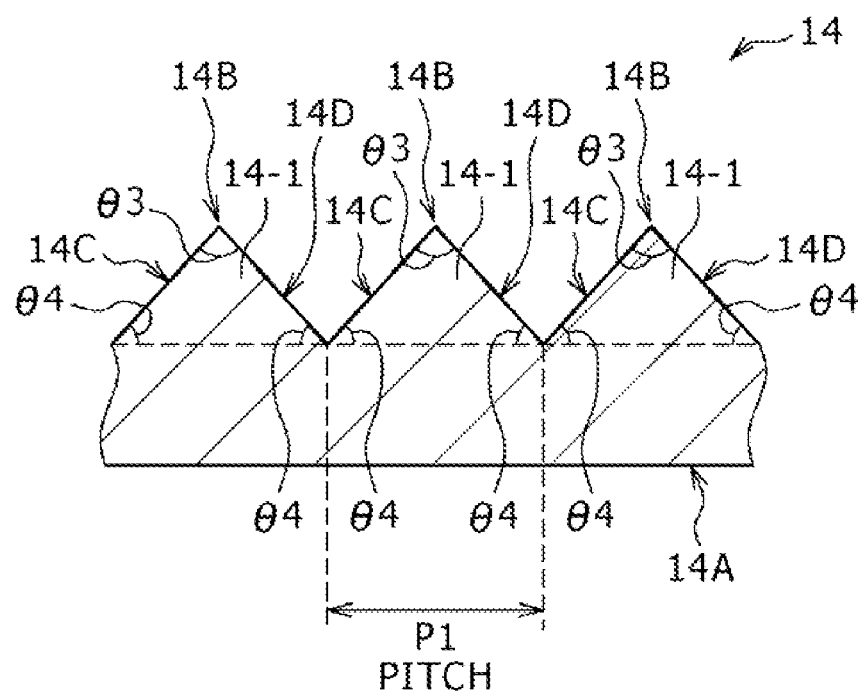
FIG. 3 is a plan view showing a modified example of the light source image dividing sheet shown in FIG. 2.

The lens sheet 14 is mainly composed, for example, of a transparent resin material. The lens sheet 14 is disposed so that the bottom plane 14A thereof is aligned in parallel with the surface of the liquid crystal panel 20. The lens sheet 14 has a plurality of prismatic lenses 14-1 (first three-dimensional structures) consecutively arranged on the surface thereof on the liquid crystal panel 20 side, as being extended along a plane in parallel with the bottom plane 14A of the lens sheet 14, as shown in FIG. 3 as one example of an enlarged sectional view. Each of the lenses 14-1 has a triangular prismatic geometry typically having slopes 14C, 14D brought into contact with a head portion 14B with an apex angle $\theta 3$, wherein the slopes 14C, 14D are obliquely opposed at a base angle of $\theta 4$ arisen up above the bottom plane 14A.

The width (pitch P) of each lens 14-1 in the direction of array is adjusted to 110 µm or larger and 500 µm or smaller. By adjusting the pitch P of the individual lenses 14-1 to 110 µm or larger, the front luminance may be maximized. On the other hand, the pitch P of the individual lenses 14-1 adjusted to 500 µm or larger may increase also the height (thickness) of the individual lenses, and may consequently raise a need of thickening the base portion having the individual lenses 14-1 formed thereon, against trends in thinning. Any effort of thinning the base portion, aiming at suppressing the thickness, may degrade rigidity of the lens sheet 14 to thereby degrade handlability, or may make it more likely to cause deflection in the process of mounting. Increase in the pitch P of the individual lenses 14-1 beyond 500 µm may reduce the effect of enhancing the luminance at the individual lenses 14-1. In short, unnecessarily large increase in the pitch P is not preferable. The pitch P is preferably adjusted to 330 µm or smaller, because the pitch P of the individual lenses 14-1 increased beyond 330 µm may only result in saturation of the rate of enhancement of luminance.

Figure 4A:
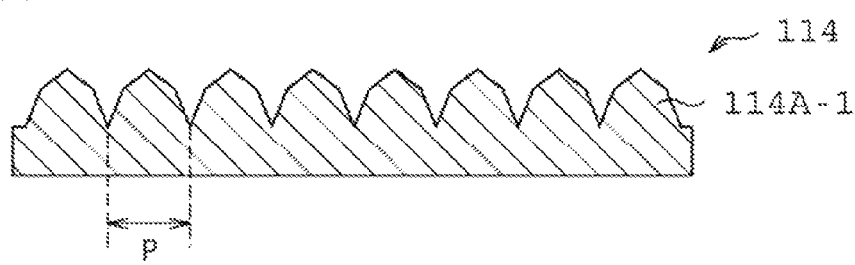
FIGS. 4A and 4B are sectional views showing modified examples of the light source dividing sheet shown in FIG. 2.
Figure 4B:
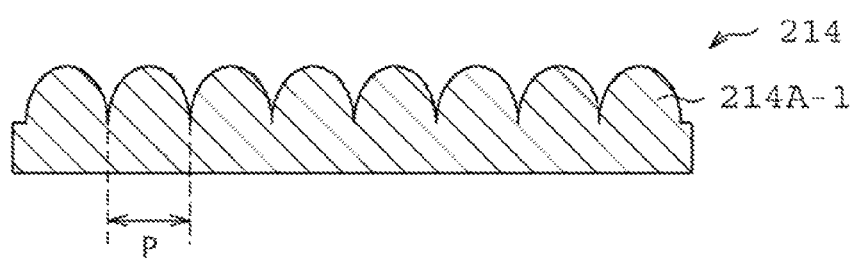

The individual lenses 14-1 are not limited to those having a triangular prismatic geometry as shown in FIG. 3, and may be lenses 114A-1 having a penta-prismatic geometry as shown in FIG. 4A, or may be lenses 214A-1 having a curved surface geometry such as an ellipsoidal or aspherical surface geometry (cylindrical geometry, for example) as shown in FIG. 4B, when viewed in the direction normal to the direction of extension of the individual lenses 214A-1.

Figure 5A:
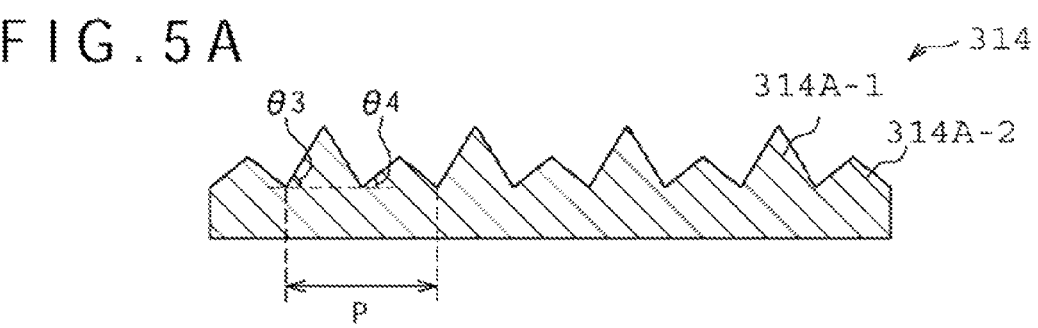
FIGS. 5A and 5B are sectional views showing other modified examples of the light source dividing sheet shown in FIG. 2.
Figure 5B:
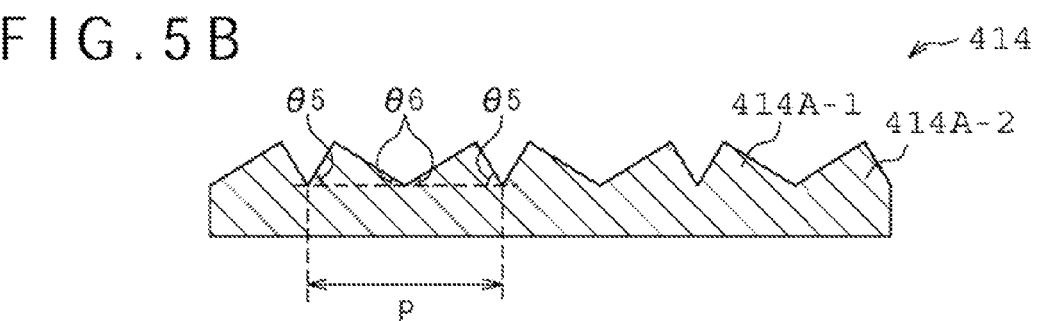

The individual lenses may have geometries and sizes not identical with each other, wherein for example (i) pairs of prisms (three-dimensional structures), each pair being composed of two adjacent lenses of a similar geometry wherein one being higher (larger) and the other being lower (smaller), may be arranged at regular pitches in the direction of extension, or (ii) pairs of prisms (three-dimensional structures), each pair being composed of two adjacent lenses of identical height and different geometries, may be arranged at regular pitches in the direction of extension, or (iii) pairs of prisms (three-dimensional structures), each pair being composed of two adjacent lenses that differ from each other both in the geometry and size (height), may be arranged at regular pitches in the direction of extension. In the case (i), for example as shown in FIG. 5A, a pair of prisms 314A-1 and 314A-2, in which the base angle $\theta 3$ (angle of inclination) of one triangular prismatic lens 314A-1 is larger than the base angle $\theta 4$ (angle of inclination) of the other triangular prismatic lens 314A-2, may be arrayed at regular pitches P in the direction of extension. Alternatively in the case (ii), for example as shown in FIG. 5B, a pair of prisms 414A-1 and 414A-2, in which two lenses respectively having different base angles $\theta 5$, $\theta 6$ (angles of inclination) are arranged symmetrically about a line, may be arranged at regular pitches P in the direction of extension. In the case (iii), for example, a pair of prisms, composed of a tall penta-prismatic lens and a short penta-prismatic lens, may be arranged at regular pitches P in the direction of extension. The individual lenses may have convex portions (protrusions) or concave portions (grooves) in the direction of extension thereof.

Figure 6A:
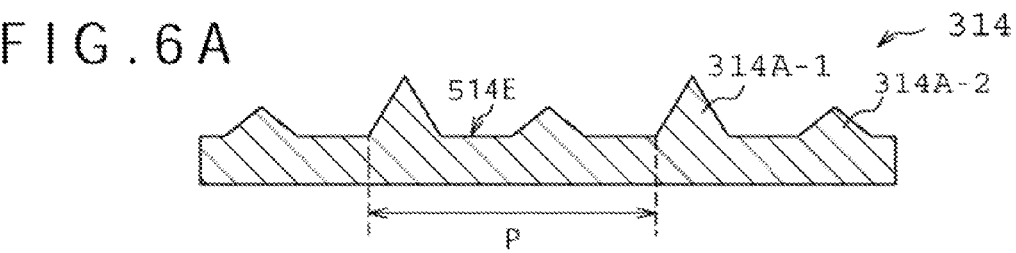
FIGS. 6A to 6C are sectional views showing other modified examples of the light source dividing sheet shown in FIG. 3.
Figure 6B:
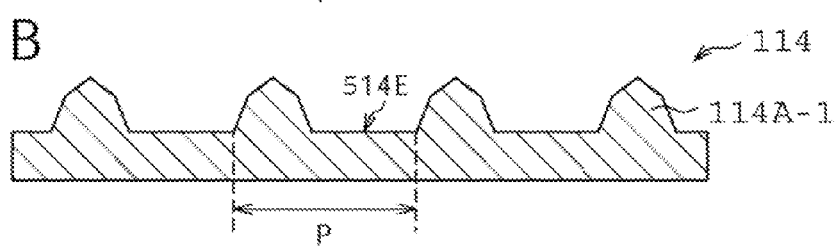
Figure 6C:
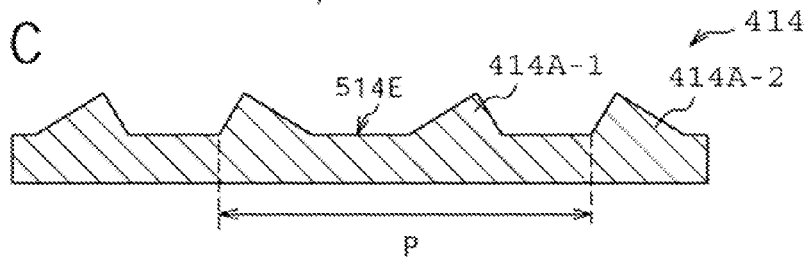
Figure 7A:
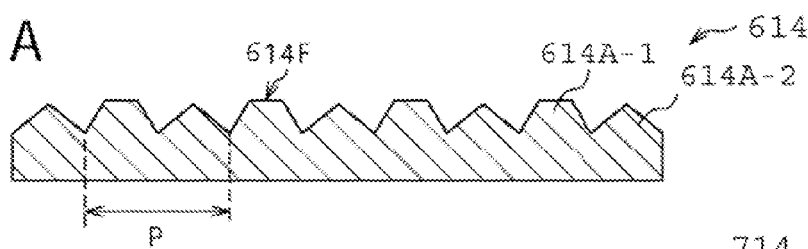
FIGS. 7A to 7C are sectional views showing exemplary configurations of the lens film on the light source side shown in FIG. 1.
Figure 7B:
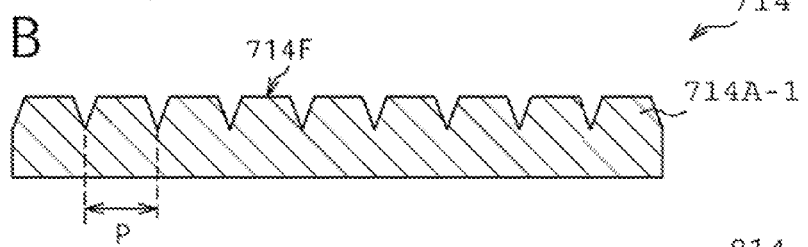
Figure 7C:
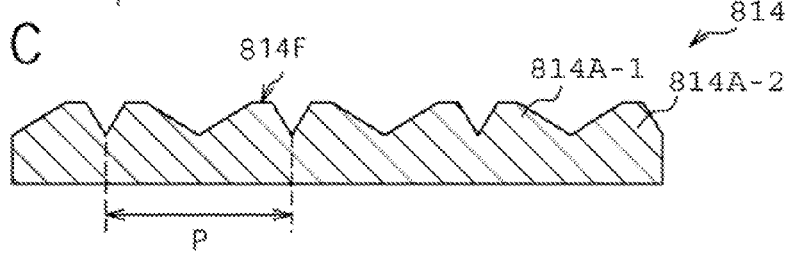

As shown in FIGS. 6A, 6B and 6C, a flat surface 514E having zero angle of inclination may be provided as the head portion between every adjacent lenses 314A-1 and 314A-2, 114A-1 and 114A-2, and 414A-1 and 414A-2. As shown in FIG. 7A, a flat surface 614F having zero angle of inclination may be provided at a portion of the lenses 614A-1 and 614A-2 projected towards the diffuser sheet 13. As shown in FIG. 7B, a flat surface 714F having zero angle of inclination may be provided at a portion of the lenses 714A-1 and 714A-2 projected towards the diffuser sheet 13. Also, as shown in FIG. 7C, a flat surface 814F having zero angle of inclination may be provided at a portion of the lenses 814A-1 and 814A-2 projected towards the diffuser sheet 13.

The lens sheet 14 may be formed by fusion-extrusion molding, heat pressing or sand blasting using a transparent resin material such as thermoplastic resin, or may be formed by transferring energy-beam-curing (for example, ultraviolet-curing) resin onto a transparent base such as PET (polyethylene terephthalate) base.

The thermoplastic resin herein may be exemplified by polycarbonate resin, acryl resin such as PMMA (polymethyl methacrylate), polyester resin such as polyethylene terephthalate, amorphous copolymer polyester resin such as MS (copolymer of methyl methacrylate and styrene), polystyrene resin and polyvinyl chloride resin.

Accordingly, the lens sheet 14 is configured to allow the components in the direction orthogonal to the direction of extension (horizontal direction, for example) of the individual lenses 14-1, out of components of light diffused by the diffuser sheet 13, to transmit therethrough while being refracted, to thereby enhance the directionality. In the lens sheet 14, the individual lenses 14-1 show a small effect of condensation based on their refractive action, with respect to the components in the direction of extension of the individual lenses 14-1 (perpendicular direction, for example), out of components of light diffused by the diffuser sheet 13, so that the light transmitted through the lens sheet 14 has a wide angle of view in the direction of extension of the individual lenses 14-1 (vertical angle of view, for example), and has a narrow angle of view in the direction normal to the direction of extension of the individual lenses 14-1 (horizontal angle of view, for example).

The reflective polarizer sheet 15 has a multi-layered structure having layers differing from each other in the refractive index alternatively stacked therein, and is configured to separate the light, already enhanced in the directionality by the lens sheet 14, into the p-wave and the s-wave using a reflective polarizer, and allows only the p-wave to transmit therethrough, while selectively reflecting the s-wave. The reflected s-wave is reflected again on a reflective sheet 17 in the lighting unit 10 to be separated again into the p-wave and s-wave, making it possible to reuse the s-wave reflected on the reflective polarizer sheet 15. The reflective polarizer sheet 15 may be formed also by holding the multi-layered structure between the diffuser sheets. According to this configuration, the p-wave transmitted through the multi-layered film may be diffused by the diffuser sheet in the reflective polarizer sheet 15, and thereby the angle of view may be widened. The reflective polarizer sheet 15 may have a rigidity to as enough as causing almost no deflection due to heat from the light source 11, even as being contributed only by the multi-layered structure, whereas the configuration having the multi-layered structure held between the diffuser sheets may further improve the rigidity, causing no deflection. In view of improving the luminance, the diffuser sheet may preferably be designed so as to reduce the haze value observed on the emission side, after being incident from the light source side (the haze value of back scattering is smaller than the haze value of forward scattering), by providing a large number of convex lens arrays, for example, on the emission side, which successfully improves the luminance if the haze value of back scattering can consequently be reduced from the haze value of forward scattering.

Figure 8:
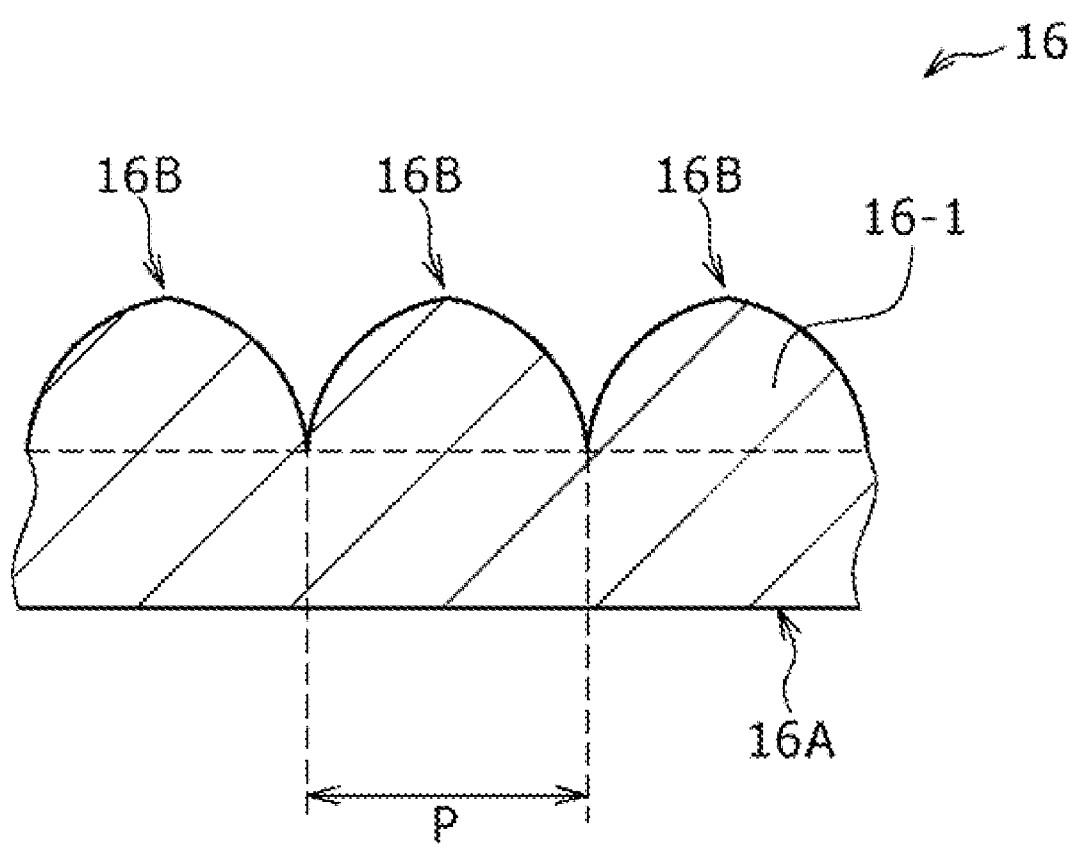
FIG. 8 is a sectional view showing an exemplary configuration of the lens film on the liquid crystal panel side shown in FIG. 1.

The lens sheet 16 is composed, for example, of a transparent synthetic resin, similarly to the lens sheet 14. The lens sheet 16 is arranged to align the bottom plane 16A thereof in parallel with the surface of the liquid crystal panel 20. The lens sheet 16 has a plurality of prismatic lenses 16-1 (second three-dimensional structures) consecutively arranged on the surface thereof on the liquid crystal panel 20 side, as being extended along a plane in parallel with the bottom plane 16A of the lens sheet 16, as shown in FIG. 8 as an example of an enlarged sectional view. The individual lenses 16-1 herein are preferably arranged so that the direction of extension of the individual lenses 16-1 are aligned normal to the direction of extension of the individual lenses 14-1 of the lens sheet 14 (horizontal direction, for example), but may be arranged away from the direction of extension of the lenses 14-1, only within a range allowable in terms of optical characteristics. For example, each of the lenses 16-1 is formed in a cylindrical geometry having a spherical or aspherical surface in the direction normal to the direction of extension of the lenses 16-1. For the case where the individual lenses 16-1 have the cylindrical geometry, the head portions may be the portions corresponded to the apexes in the direction normal to the direction of extension of the lenses 16-1.

The width (pitch P) of the individual lenses 16-1 in the direction of array is adjusted to 50 μm or smaller. Adjustment of the pitch P of the individual lens 16-1 to 50 μm or smaller can make a periodic stripe pattern (moire) less noticeable even if it should appear on the liquid crystal panel 20 due to interference between a regular repetitive pattern formed by combination of pixels, and a regular repetitive pattern formed by the individual lenses 16-1 composing the lens sheet 16 which is an optical component. Excessively narrowed pitch P of the individual lenses 16-1 may, however, reduce the effect of enhancing the luminance, so that the pitch P is preferably adjusted to 1 μm or larger, and more preferably 10 μm or larger.

The individual lenses 16-1 may not necessarily be identical in the geometry and size, similarly to the above-described individual lenses 12-1, allowing adoption of various three-dimensional structures respectively exemplified by those shown in FIGS. 4A and 4B to FIGS. 7A, 7B and 7C.

Accordingly, the lens sheet 16 is configured to allow the components in the orthogonal direction to the extended direction (perpendicular direction, for example) of the individual lenses 16-1, out of components of light diffused by the reflective polarizer sheet 15, to transmit therethrough while being refracted, to thereby enhance the directionality. In the lens sheet 16, the individual lenses 16-1 show no effect of condensation based on their refractive action, with respect to the components in the direction of extension of the individual lenses 16-1 (horizontal direction, for example), out of components of light diffused by the reflective polarizer sheet 15, so that the lens sheet 16 functions as moderating unbalance produced by the lens sheet 14. As a consequence, for the case where the direction of extension of the individual lenses 16-1 and the direction of extension of the individual lenses 14-1 are aligned normal to each other, the light emitted from the lighting unit 10 may be well-balanced, characterized in that the angle of view in the direction normal to the direction of extension of the individual lenses 16-1 (horizontal angle of view) and the angle of view in the direction of extension of the individual lenses 16-1 (vertical angle of view) are almost equal. An additional advantage is that the front luminance is enhanced to a satisfactory degree, because as described in the above, the components in the direction normal to the direction of extension of the individual lenses 16-1 (horizontal direction, for example), out of components of light diffused by the reflective polarizer sheet 15, are condensed into the direction normal to the liquid crystal panel 20.

Figure 9:
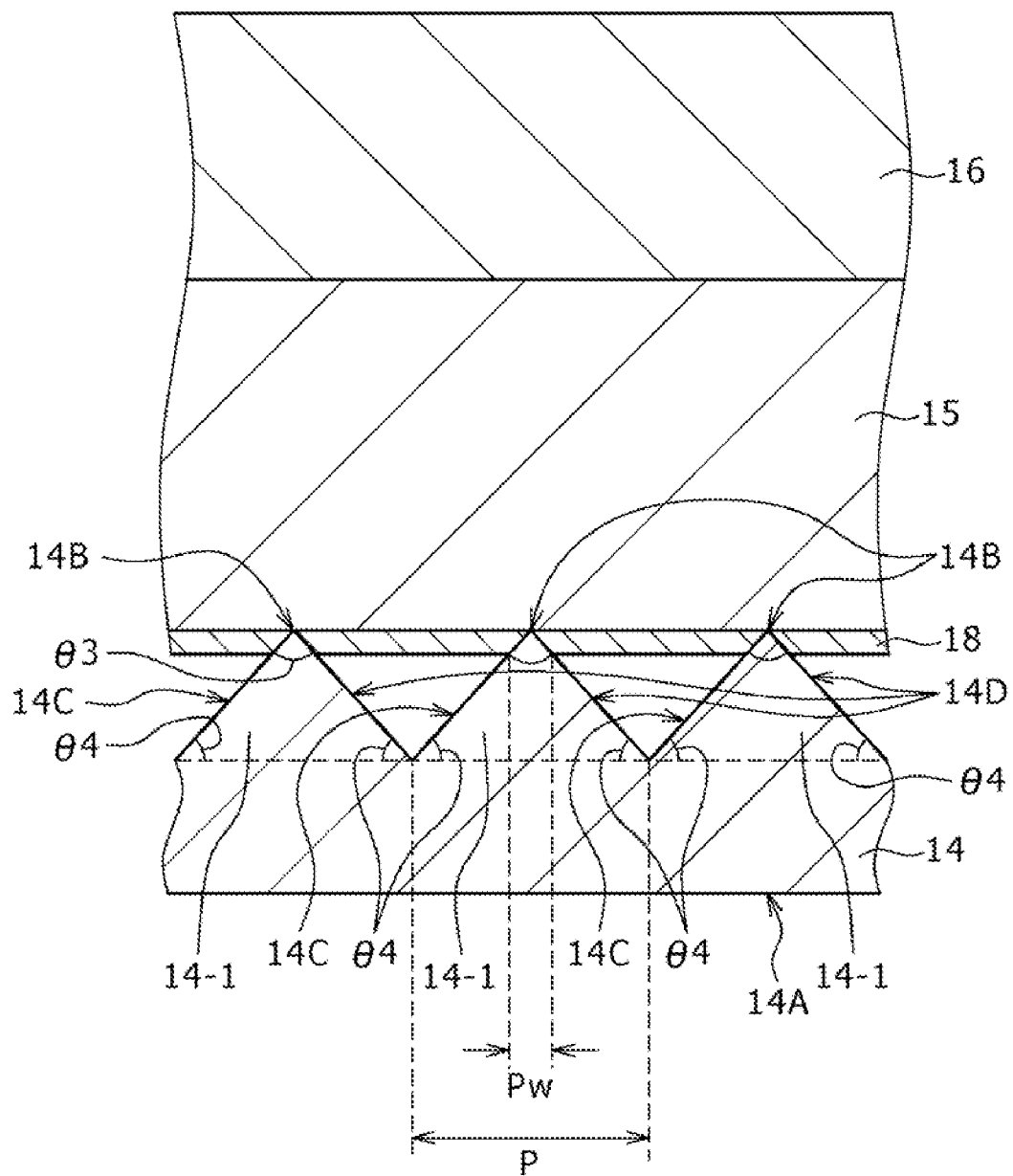
FIG. 9 is a sectional view explaining bonding of the lens film on the light source side and the reflective polarizer sheet shown in FIG. 1.

By the way, in the stacked structure composed of the lens sheet 14, the reflective polarizer sheet 15 and the lens sheet, at least the lens sheet 14 and the reflective polarizer sheet 15 are bonded with each other. It is more preferable that the lens sheet 16 and the reflective polarizer sheet 15 are bonded with each other. The term "Bonding" herein is a concept including mechanical fixation of the both typically through crimping, or chemical fixation of the both as shown in FIG. 9, while placing in between a bonding layer 18 formed by coating on the surface of either one, or on the surfaces of the both. The bonding layer 18 is composed, for example, of thermoplastic resin, thermosetting resin, energy beam curing resin or the like. The thermoplastic resin may be exemplified by ethylene-vinyl acetate-base resin, acryl-base resin, urethane-base resin and polyester-base resin, and the energy beam curing resin may be exemplified by acryl-base UV-curing adhesive.

It is to be noted that, for the case where the lenses 14-1 have the head portions with an acute or obtuse apex angle, and the head portions are allowed to intrude into the reflective polarizer sheet 15 or the bonding layer 18, the intruded portions are no more brought into contact with the air and thereby no more contributive to enhancement in the luminance, but instead contributive to diffusion of light. In short, the lenses 14-1 may be varied in the optical characteristics thereof with respect to the incident light. Variation in the optical characteristics of the lenses 14-1 with respect to the incident light is desired to be minimum, so that the width of bonding Pw of the portions of the head portions intruded into the reflective polarizer sheet 15 or into the bonding layer 18 (width of bonding Pw of the head portion) is preferably adjusted to 20% or smaller of the pitch P of the lenses 14-1.

Also for the case where the lenses 14-1 have hyperbolic or aspherical curved surfaces in the direction of array, and the portions of the curved surfaces composing the ridgelines thereof form the head portions, the width of bonding Pw of the head portions is preferably adjusted to 20% or smaller of the pitch P of the lenses 14-1. For the case where the lenses 14-1 have the head portions composing flat surfaces in parallel with the bottom plane 14A, making the head portions intruded into the reflective polarizer sheet 15 or into the bonding layer 18 will isolate the intruded portions from the air, while leaving the optical characteristics of the lenses 14-1 with respect to the incident light almost unchanged. Therefore, this case is exempt from the above-described limitations. The optical characteristics of the lenses 16-1 with respect to the incident light remains almost unchanged also for the case where the lens sheet 16 and the reflective polarizer sheet 15 are bonded, because both bonding surfaces are flat. Therefore, also this case is exempt from the above-described limitations.

Paragraphs below will describe basic operations in image display of the display device 1 configured the above.

First, in the lighting unit 10, light emitted from the light source 11 is divided into micro-fluxes by the light source image dividing sheet 12, light source images obtained by the division are diffused by the diffuser sheet 13, enhanced in the directionality by the lens sheet 14, and then emitted towards the liquid crystal panel 2.

The liquid crystal panel 20 allows the incident light from the lighting unit 10 to transmit therethrough, depending on magnitude of voltage applied on the pixel basis between the transparent electrode 23 and the transparent electrode 27 as the opposing electrode, and emits the light towards the observer's side after dividing it into colors by the color filter 28. Color image is displayed in this way.

In this embodiment, the portions of the lenses 14-1 of the lens sheet 14, projected towards the reflective polarizer sheet 15 side (head portions 14B and head portions 14E, for example), are bonded to the reflective polarizer sheet 15 as described in the above, so that deformation behavior of the lens sheet 14 is limited by integration with the reflective polarizer sheet 15. By virtue of this configuration, the lens sheet 14 may almost be prevented from deflecting, without thickening it nor composing it using a hard material. In addition, for the case where the lens sheet 16 and the reflective polarizer sheet 15 are bonded with each other, the lens sheet 14 is further reinforced with the lens sheet 16, so that the lens sheet 14 may almost completely be prevented from deflecting even when it is thinned.

If the width of bonding Pw between the portions of the lenses 14-1 of the lens sheet 14, projected towards the reflective polarizer sheet 15 side (head portions 14B and head portions 14E, for example), and the reflective polarizer sheet 15 is adjusted to 20% or smaller of the pitch P of the lenses 14-1 in this embodiment, the lens sheet may almost completely be prevented from deflecting, while minimizing decrease in the luminance due to such bonding. In addition, the lens sheet may almost completely be prevented from deflecting, while avoiding decreased in the luminance due to such bonding, if the lateral width of the lenses 14-1 is adjusted to 110 µm or larger and 500 µm or smaller.

Because the lens sheet 14 may almost completely be prevented from deflecting in this embodiment as described in the above, there is no fear of causing non-uniformity in the luminance ascribable to deflection of the lens sheet 14, or injuring the liquid crystal panel. In addition, bonding of the lens sheet 14 and the reflective polarizer sheet 15, and also the reflective polarizer sheet 15 and the lens sheet 16 may successfully reduce the number of components, and can thereby reduce the number of process steps necessary for the assembling.

Because the lens sheets 14, 16 are used in this embodiment, the light emitted from the lighting unit 10 may be well-balanced, as being characterized in that the angle of view in the direction normal to the direction of extension of the individual lenses 16-1 (horizontal angle of view) and the angle of view in the direction of extension of the individual lenses 16-1 (vertical angle of view) are almost equal, better than in the case where only the lens sheet 14 was simply used. Use of the lens sheet 16 in addition to the lens sheet 14 raises another advantage in that the front luminance is enhanced to a satisfactory degree, because the components in the direction orthogonal to the direction of extension of the individual lenses 16-1 (horizontal direction, for example), out of components of light diffused by the reflective polarizer sheet 15, are condensed into the direction normal to the liquid crystal panel 20.

EXAMPLES

Examples of the display device 1 according to the above-described embodiment will be explained below.

First Experiment

The lens sheets 14 were manufactured by fusion-extrusion molding using a polycarbonate resin. The lens sheets having pitches P of the individual lenses 14-1 of 30 µm, 50 µm, 85 µm, 110 µm, 160 µm, 200 µm and 330 µm were prepared, and for each of these pitches, the lenses 14-1 having geometries of isosceles right triangular prism (prism) (Examples 1-1 to 1-7, 2-1 to 2-7, Comparative Examples 1, 2), and of semi-cylinders having hyperbolic surfaces in the direction normal to the direction of extension (Examples 3-1 to 3-7, 4-1 to 4-7, Comparative Examples 3, 4) were prepared. The reflective polarizer sheet 15 used herein was a reflective polarizer from 3M. The reflective polarizer does not have a diffuser function. The lens sheet 16 was not used in this Experiment.

The hyperbolic surfaces of the lenses described in the above were designed as expressed below, on the basis of lens geometry of 50-µm pitch. In the equations below, Z corre sponds to the thickness-wise direction of the lenses 14-1, and X corresponds to the direction of array of the lenses 14-1.

(1) P: 50 μm $$Z=X^2/(5+\sqrt{(25+X^2)})$$

(2) P: 30 μm $$Z=0.6(X/0.6)^2/(5+\sqrt{(25+(X/0.6)^2)})$$

(3) P: 85 μm $$Z=1.7(X/1.7)^2/(5+\sqrt{(25+(X/1.7)^2)})$$

(4) P: 110 μm $$Z=2.2(X/2.2)^2/(5+\sqrt{(25+(X/2.2)^2)})$$

(5) P: 160 μm $$Z=3.2(X/3.2)^2/(5+\sqrt{(25+(X/3.2)^2)})$$

(6) P: 200 μm $$Z=4(X/4)^2/(5+\sqrt{(25+(X/4)^2)})$$

(7) P: 300 μm $$Z=6(X/6)^2/(5+\sqrt{(25+(X/6)^2)})$$

In Examples 1-1 to 1-7, 2-1 to 2-7, 3-1 to 3-7, and 4-1 to 4-7, the head portions of the lenses 14-1 and the reflective polarizer sheet 15 were bonded while placing the bonding layer 18 in between, and fixing the width of bonding Pw to 10 μm for all cases. Examples, therefore, differ from each other in the ratio of bonding (Pw/P), maximized at 0.33. The bonding layer 18 herein was formed using an acryl-base, pressure-sensitive adhesive.

On the other hand, in Comparative Examples 1 to 3, the lens sheet 14 was simply stacked with the reflective polarizer sheet 15, without bonding the head portions of the lenses 14-1 and the reflective polarizer sheet 15. In Comparative Example 5, even the lens sheet 14 was omitted, and only the reflective polarizer sheet 15 was disposed.

TABLE 1

| | Lens geometry | Pw/P | P (μm) | Screen size | Front luminance (%) | Occurrence of Deflection |
|---|---|---|---|---|---|---|
| Example 1-1 | Prism | 0.33 | 30 | 19 inches | 88 | No |
| Example 1-2 | | 0.20 | 50 | | 92 | No |
| Example 1-3 | | 0.12 | 85 | | 96 | No |
| Example 1-4 | | 0.09 | 110 | | 98 | No |
| Example 1-5 | | 0.063 | 160 | | 100 | No |
| Example 1-6 | | 0.05 | 200 | | 99 | No |
| Example 1-7 | | 0.03 | 330 | | 100 | No |
| Example 2-1 | Prism | 0.33 | 30 | 32 inches | 81 | No |
| Example 2-2 | | 0.20 | 50 | | 89 | No |
| Example 2-3 | | 0.12 | 85 | | 94 | No |
| Example 2-4 | | 0.09 | 110 | | 95 | No |
| Example 2-5 | | 0.063 | 160 | | 97 | No |
| Example 2-6 | | 0.05 | 200 | | 98 | No |
| Example 2-7 | | 0.03 | 330 | | 98 | No |
| Comparative Example 1 | Prism | 0 | 50 | 19 inches | 100 | Slightly |
| Comparative Example 2 | Prism | 0 | 50 | 32 inches | 90 | Yes |
| Comparative Example 5 | — | — | — | 19 inches | 78 | No |

TABLE 2

| | Lens geometry | Pw/P | P (μm) | Screen size | Front luminance (%) | Occurrence of Deflection |
|---|---|---|---|---|---|---|
| Example 3-1 | Hyperboloid | 0.56 | 30 | 19 inches | 80 | No |
| Example 3-2 | | 0.34 | 50 | | 90 | No |

TABLE 2-continued

| | Lens geometry | Pw/P | P (μm) | Screen size | Front luminance (%) | Occurrence of Deflection |
|---|---|---|---|---|---|---|
| Example 3-3 | | 0.20 | 85 | | 96 | No |
| Example 3-4 | | 0.155 | 110 | | 98 | No |
| Example 3-5 | | 0.106 | 160 | | 100 | No |
| Example 3-6 | | 0.085 | 200 | | 101 | No |
| Example 3-7 | | 0.057 | 330 | | 101 | No |
| Example 4-1 | Hyperboloid | 0.56 | 30 | 32 inches | 75 | No |
| Example 4-2 | | 0.34 | 50 | | 84 | No |
| Example 4-3 | | 0.20 | 85 | | 90 | No |
| Example 4-4 | | 0.155 | 110 | | 95 | No |
| Example 4-5 | | 0.106 | 160 | | 98 | No |
| Example 4-6 | | 0.085 | 200 | | 99 | No |
| Example 4-7 | | 0.057 | 330 | | 100 | No |
| Comparative Example 3 | Hyperboloid | 0 | 50 | 19 inches | 90 | Slightly |
| Comparative Example 4 | Hyperboloid | 0 | 50 | 32 inches | 86 | Yes |
| Comparative Example 5 | — | — | — | 19 inches | 78 | No |

Figure 10:
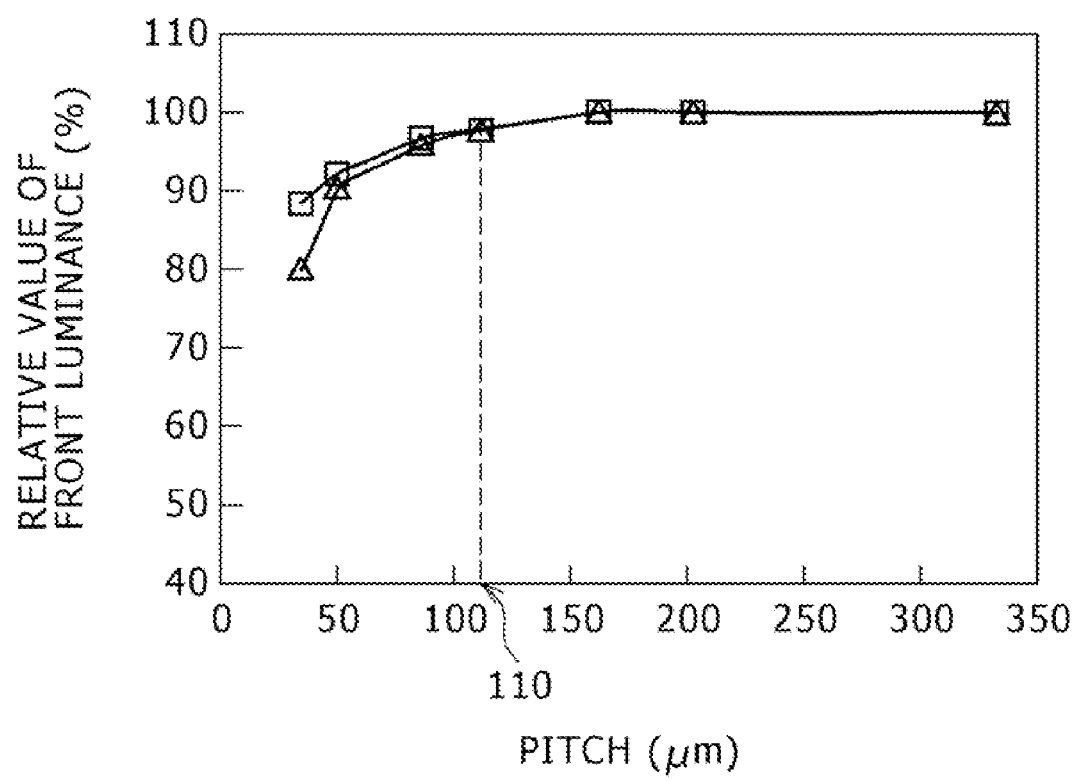
FIG. 10 is a drawing explaining relations between pitch of the lens film on the light source side shown in FIG. 1 and front luminance.

The front luminance was measured in the individual Examples and Comparative Examples. Results were shown in Table 1, Table 2 and FIG. 10. Measurement values of the front luminance were expressed as values relative to a measurement value of the front luminance obtained for the case where the 50-μm-pitch lens sheet 14 was simply stacked thereon with the reflective polarizer sheet 15

Comparative Example 1

The front luminance was measured as follows. In a dark room, a video signal for white state was input to each of the display devices of Examples and Comparative Examples, each device was kept illuminated for 2 hours, and the luminance was measured by a spectroradiometer "CS-1000" from Konica Minolta Holdings, Inc. set 500 mm away from the surface of the panel. The measurement was repeated three times, and an average value thereof was adopted as a measurement value.

The deflection of the optical sheet after being mounted to the panel was evaluated as follows. In a dark room, a video signal for white state was input to each of the display devices of Examples and Comparative Examples, each device was kept illuminated for one hour, and the state of non-uniformity in the luminance was visually observed in the direction approximately 60° inclined away from the front of the panel, and was evaluated as the deflection of the sheet. In Table 1, "No" indicates that no deflection was observed, "Slightly" indicates that slight deflection was observed, and "Yes" indicates that apparent deflection was observed.

As shown in Table 1 and Table 2, all samples having large ratios of bonding (Pw/P), even identical in the geometries of the lenses 14-1, were found to be lowered in the front luminance. This is because the function of condensing light of the lenses 14-1 degrades as Pw/P becomes larger. Among these, Examples of Pw/P>0.2 generally showed large ratios of decrease in the luminance. In particular, Example 1-1, 2-1, 3-1 and 4-1 showed large ratios of decrease in the luminance, minimizing the effect of provision of the lens sheet 14.

On the contrary, Examples of Pw/P<0.2 showed generally small ratios of decrease in the luminance, and in particular those of Pw/P<0.2 showed ratios of decrease in the luminance of 10% or smaller, more specifically 5% or smaller. In particular, those having the pitch P as large as 110 μm or above were successfully suppressed in decrease in the luminance as compared with Comparative Examples, as typically proven by a ratio of reduction in the luminance of 3% in Examples 1-4 and 2-4. No deflection was observed in Examples.

As described in the above, the display devices of Examples manufactured under conditions of Pw/P<0.2 can prevent deflection of the lens sheet which has been likely to occur when the sheet 14 and the reflective polarizer sheet 15 were not bonded with each other, and can minimize decrease in the front luminance.

Second Experiment

Two reflective polarizer sheets 15 differing in the diffusion characteristics were prepared, these reflective polarizer sheets 15 were combined with the lens sheet 14 having the lenses 14-1 with predetermined three-dimensional structures arranged thereon to configure the display devices, the front luminance was measured, and presence/absence of moire was confirmed. The lens sheet 14 herein was disposed so as to align the direction of extension of the lenses 14-1 in parallel with the horizontal direction of the screen. The reflective polarizer sheet 15 has a diffuser sheet provided on the incident side thereof.

Table 3 shows the diffusion characteristics of thus-prepared reflective polarizer sheets 15, more specifically haze values based on measurement of forward scattering and haze values based on measurement of back scattering, front luminance values as the optical characteristics, and presence/absence of deflection.

deviated from the direction of incidence by forward scattering (the diffusion surface is in the light-incident side), and by back scattering (the diffusion surface is in the light-outgoing side) were measured. The haze was measured using a mode of measurement conforming to JIS-K-7136, available in the above-described hazemeter.

Two these reflective polarizer sheets 15 and a liquid crystal panel having a pixel pitch of 320 μm were respectively combined to configure the display devices. Measurement values of front luminance, and results of evaluation of occurrence of deflection after mounting of thus-configured display devices were shown in Table 2.

It was confirmed that Examples 5-1, 5-2 having the diffuser sheet provided on the incident side of the reflective polarizer sheet 15 showed effects of enhancing the luminance, as compared with the front luminance (78%) attained by the reflective polarizer only. Deflection was not observed.

Third Experiment

The reflective polarizer sheet 15 was bonded, on the incident side thereof, with a 200-μm-pitch hyperbolic lens sheet 14 (Example 3-6), and on the emission side thereof, with a hyperbolic lens sheet 16 so as to align the direction of extension thereof normal to the direction of extension of the lens sheet 14 bonded on the incident side, and the front luminance was measured. The lens sheets 16 prepared herein were those

TABLE 3

|  | Haze value | | Difference in haze | Screen size | Front luminance | Occurrence of Deflection |
| --- | --- | --- | --- | --- | --- | --- |
|  | Forward scattering | Back scattering | | | | |
| Example 5-1 | 96.2 | 95.2 | 1.0 | 19 inches | 88 | No |
| Example 5-1 | 83.7 | 74.6 | 9.1 | 19 inches | 92 | No | having pitches of 50 μm, 10 μm and 200 μm. Results were respectively shown in Table 4.

TABLE 4

|  | Sheet on incident side | Sheet on emission side | Screen size | Front luminance | Occurrence of Deflection |
| --- | --- | --- | --- | --- | --- |
| Example 6-1 | Hyperboloid, 200 μm pitch | Hyperboloid, 50 μm pitch | 19 inches | 107 | No |
| Example 6-2 | | Hyperboloid, 10 μm pitch | | 102 | No |
| Example 6-3 | | Hyperboloid, 200 μm pitch | | 103 | No |

The haze of the reflective polarizer sheet 15 was measured using hazemeter HM-150 from Murakami Color Research Laboratory Co., Ltd. Of components of the transmitted light coming through the test pieces, percentages of components As shown in Table 4, the front luminance may be improved, and deflection in the process of mounting may be avoidable, by providing the lens sheet not only on the incident side, but also on the emission side of the reflective polarizer sheet 15.

The present application has been described above but should not be deemed limited in scope to this description. For example, the light source image dividing sheet 12 in the above-described embodiments was provided between the light source 11 and the diffuser sheet 13, but the light source image dividing sheet 12 may be omissible. For the case of omission of the light source image dividing sheet 12, the diffuser sheet 13 may preferably function as a diffuser plate capable of converting a linear light source or a spot light source into a surface light source. For the case of omission of the light source image dividing sheet 12, it is also possible to make the lens sheet 14 function as the light source image dividing sheet 12.

The lens sheets 14, 16 were provided as holding the reflective polarizer sheet 15 in between in the above-described embodiments, but at least one of the lens sheets 14, 16 may be replaced by a diffuser sheet 19. FIG. 11 shows an exemplary case of provision of the diffuser sheet 19 in place of the lens sheet 16. The diffuser sheet 19 is composed, for example, of a diffuser plate formed by dispersing a diffuser material (filler) in a transparent resin, a diffuser film formed by coating a transparent resin (binder) containing a diffuser material onto a film-like transparent resin having a relatively small thickness, or a combined material of them, and may have diffusion anisotropy similarly to the lens sheet 16, or may simply have diffusion isotropy.

Although the embodiments in the above specifically explained the display device 1 referring to specific configurations thereof, the display device 1 may not necessarily have all of these layers, and may have any other layer(s). For example, the display device 1 may have a diffuser sheet between the lens sheet 14 and the liquid crystal panel 20. That is, the configuration may be optional depending on applications and purposes.

The light source 11 exemplified by the linear light source 11A in the above-described embodiments is not limited thereto, and allows adoption of, for example, those having spot light sources arranged in a matrix pattern.

The present application is also applicable to various driving systems including active matrix driving, simple matrix driving and so forth.

Moreover, the display device 1 having been described as being applied to liquid crystal display in the above-described embodiments may, of course, be applicable to any display devices based on other principles.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical sheet comprising:
a first lens sheet having a plurality of first three-dimensional structures arrayed to extend along a first direction on a light-emitting surface thereof;
a reflective polarizer sheet for transmitting either one of p-polarization component and s-polarization component of incident light and reflecting the other of p-polarization component and s-polarization component of the incident light,
a bonding layer;
a second lens sheet having a plurality of second three-dimensional structures arrayed to extend along a second direction on a first surface thereof, the second direction intersecting with the first direction of the first three-dimensional structure;
wherein head portions of the first three-dimensional structures are bonded to the reflective polarizer sheet through the bonding layer;
each of the first three-dimensional structures arrayed in the first direction has a width of not less than 110 μm and not more that 330 μm;
each of the first three-dimensional structures arrayed in the first direction has a bonding width of not more that 20% of the width of the arrayed direction of the first three-dimensional structures; and
wherein a second surface of the second lens sheet is bonded to the reflective polarizer sheet on a surface of the reflective polarizer that is opposite to the surface of the reflective polarizer to which the first lens sheet is bonded.

2. The optical sheet as claimed in claim 1, wherein each of the first three-dimensional structures has a prismatic geometry, and a hyperbolic or a spherical curved surface in an array direction.

3. The optical sheet as claimed in claim 1, wherein each of the first three-dimensional structures has a plurality of convex portions in the extended or arrayed direction.

4. The optical sheet as claimed in claim 1, wherein the reflective polarizer sheet has a stacked structure in which a multi-layered film having different refractive indices between adjacent films each other is held between diffuser films.

5. The optical sheet as claimed in claim 1, further comprising a diffuser film having a haze value due to forward scattering which is larger than a haze value due to back scattering.

6. The optical sheet as claimed in claim 1, wherein each of the second three-dimensional structures has a hyperbolic or aspherical curved surface in the arrayed direction.

7. The optical sheet as claimed in claim 1, wherein each of the second three-dimensional structures has a width of not more than 50 μm.

8. A display device comprising:
a panel driven based on image signals;
a light source emitting light for illuminating the panel;
an optical sheet provided between the panel and the light source;
wherein the optical sheet has a lens sheet having a plurality of first three-dimensional structures arrayed to extend along a first direction on a light emitting surface thereof, a bonding layer, and a reflective polarizer sheet for transmitting either one of p-polarization component and s-polarization component of incident light and reflecting the other of p-polarization component and s-polarization component of the incident light, head portions of the three-dimensional structures being bonded to the reflective polarizer sheet through the bonding layer;
a second lens sheet having a plurality of second three-dimensional structures arrayed to extend along a second direction on a first surface thereof, the second direction intersecting with the first direction of the first three-dimensional structure;
each of the first three-dimensional structures arrayed in the first direction has a width of not less than 110 μm and not more that 330 μm;
each of the first three-dimensional structures arrayed in the first direction has a bonding width of not more that 20% of the width of the arrayed direction of the first three-dimensional structures; and
wherein a second surface of the second lens sheet is bonded to the reflective polarizer sheet on a surface of the reflective polarizer that is opposite to the surface of the reflective polarizer to which the optical sheet is bonded.

9. The optical sheet as claimed in claim 1, wherein the first three-dimensional structures and the second three-dimensional structures extend in a same direction away from the surfaces of the first lens sheet and the second lens sheet respectively.

10. The display device as claimed in claim 8, wherein the first three-dimensional structures and the second three-dimensional structures extend in a same direction away from the surfaces of the optical sheet and the second lens sheet respectively.

* * * * *